JACK E. BRIDGES
*INVENTOR.*

BY Francis W. Crotty

HIS ATTORNEY.

JACK E. BRIDGES
*INVENTOR.*
BY Francis W. Crotty
HIS ATTORNEY.

Dec. 27, 1960

J. E. BRIDGES

SECRECY TELEVISION DECODING ARRANGEMENT AND METHOD OF OPERATING THE SAME 2,966,543

Filed Nov. 23, 1955

5 Sheets-Sheet 4

2,966,543

SECRECY TELEVISION DECODING ARRANGEMENT AND METHOD OF OPERATING THE SAME

Jack E. Bridges, Fort Wayne, Ind., assignor to Zenith Radio Corporation, a corporation of Delaware Filed Nov. 23, 1955, Ser. No. 548,707

13 Claims. (Cl. 178—5.1)

This invention relates to a secrecy television system in which a television signal is transmitted in coded form to be utilized only in receivers equipped with suitable decoding apparatus.

Secrecy television systems have been proposed wherein the television signal is coded in accordance with a code schedule at the transmitter, and an auxiliary key or code signal indicative of that code schedule is transmitted in camouflaged or scrambled form to the receivers along with the coded television signal. The code signal is interpreted or read in a manner known only by authorized receivers to develop a decoding signal capable of decoding or unscrambling the telecast. A system of this general type is shown, for example, in copending application Serial No. 366,727, filed July 8, 1953, and issued September 16, 1958, as Patent 2,852,598, in the name of Erwin M. Roschke, and assigned to the present assignee.

Such a coding technique does achieve effective coding while at the same time preserving an adequate degree of secrecy. However, it may sometimes be desirable to code and decode a television signal in such a way that transmission of auxiliary coding information is unnecessary.

In accordance with the present invention, a decoding arrangement is provided which examines the coded or scrambled television signal itself and determines the code pattern from such examination. The transmitter may effect mode changes in any and all possible random or periodic patterns and decoding will still be realized.

It is, accordingly, an object of the present invention to provide an improved decoding arrangement for a secrecy television system.

It is another object of the invention to provide a novel method of operating a secrecy television receiver.

It is still another object to provide an improved decoding arrangement for utilizing a received coded television signal which has been varied in composition from one to another of a plurality of modes in accordance with a predetermined code schedule.

It is a further object of the invention to provide a decoding arrangement which effects mode changes to achieve decoding in accordance with the code schedule of a received coded television signal without requiring any auxiliary coding information from the transmitter.

It is an additional object to provide a decoding arrangement which determines the code pattern of a received coded television signal from examination of such a signal.

A decoding arrangement, in accordance with the invention, for utilizing a received coded television signal which contains signal components of various frequencies falling within a predetermined range and which has been varied in mode from one to another of a plurality of modes in accordance with a predetermined code schedule comprises means for selecting and comparing with respect to one another successive portions of equal duration of the coded television signal, the portions being long compared to the periods of the signal components and representing different intelligence information, to determine from such comparison each mode change and to develop an actuating signal representing the mode changes. The arrangement also has a decoding device which is operated in response to the actuating signal for varying the mode of the coded television signal effectively to accomplish decoding.

The features of this invention which are believed to be new are set forth with particularity in the appended claims. The invention, together with further objects and advantages thereof, may best be understood, however, by reference to the following description in conjunction with the accompanying drawings, in which:

The illustrated receiver embodying the invention is adapted to utilize a received coded television signal wherein the time relationship between the video and synchronizing components is varied from time to time in accordance with a code schedule. One transmitter for producing such a coded television signal is shown in the aforementioned Roschke application Serial No. 366,727, and has not been shown here to avoid unduly encumbering the application. Briefly, a counting device is actuated in response to line-drive pulses to develop a signal of square wave form having amplitude changes after each series of a predetermined number of line-trace intervals. This signal is employed to effect mode changes in the transmitter by periodically introducing an incremental time delay $\Delta t$ between the video and synchronizing components. In order to further enhance the complexity of the scrambling pattern, during each of the field-retrace intervals random code pulses are developed and supplied to various input circuits of a bi-stable multivibrator to effect actuation thereof in random fashion. The counting device is rephased during each field-retrace interval under the control of the bi-stable multivibrator and thus the square wave signal from the counter is phase modulated in random manner.

In the Roschke system, the code pulses are transmitted to subscriber receivers during the field-retrace intervals along with the composite video signal in order to permit receivers to respond to the combination and effect decoding. With the present invention, however, such coding information is not necessary and would not be transmitted.

Figure 1:
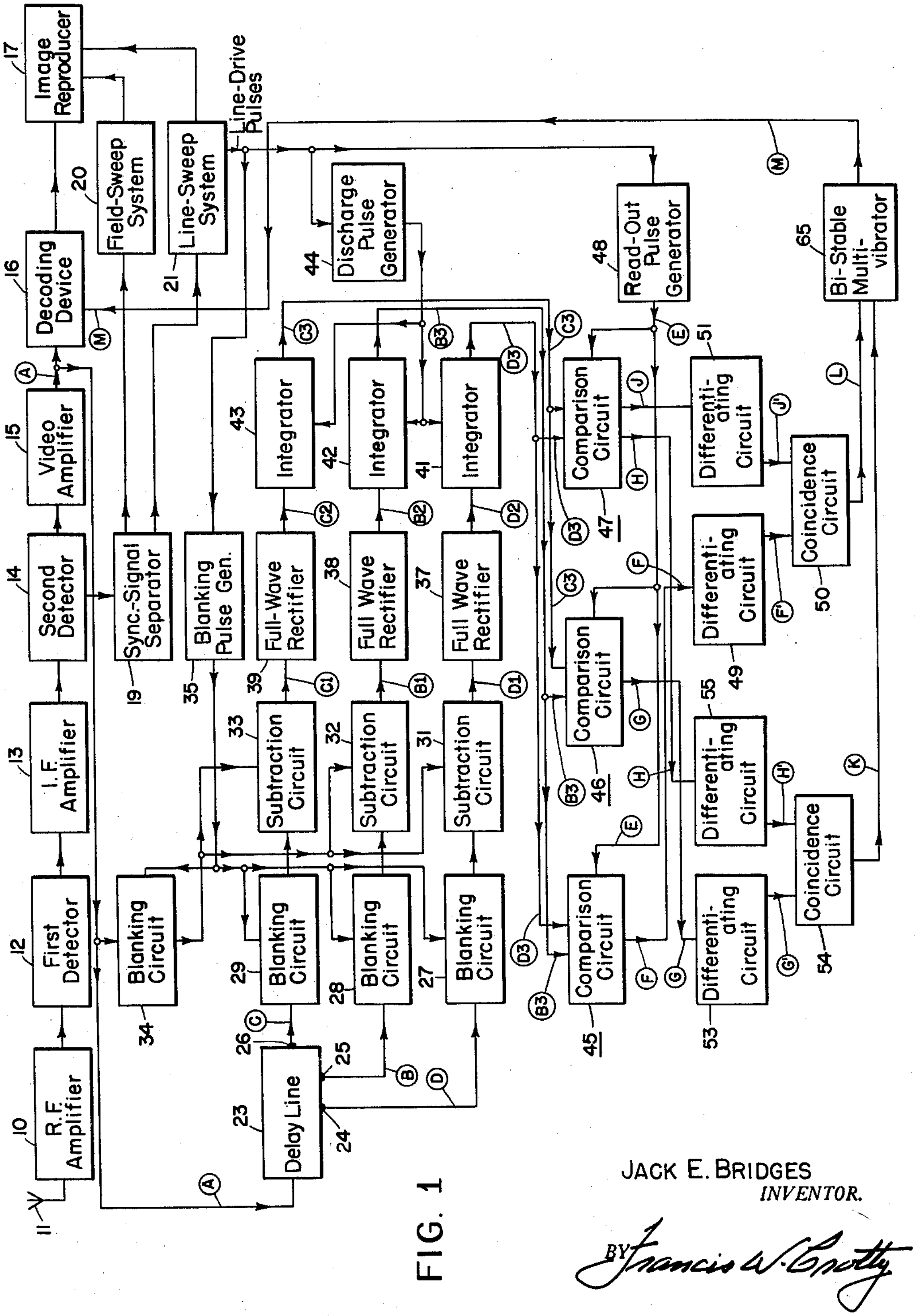
Figure 1 represents a television receiver including a decoding arrangement constructed in accordance with the invention.

The receiver of Figure 1 comprises a radio-frequency amplifier 10 having input terminals connected to an antenna circuit 11 and output terminals connected to a first detector 12. This detector is coupled through an intermediate-frequency amplifier 13 to a second detector 14 which, in turn, is connected to the input circuit of a video amplifier 15. The output circuit of the video amplifier is coupled through a decoding device 16 to the input electrodes of a cathode-ray image-reproducing device 17.

Decoder 16 may be similar to that disclosed and claimed in copending application Serial No. 243,039, filed August 22, 1951, and issued August 7, 1956 as Patent 2,758,153, in the name of Robert Adler, and assigned to the present assignee. It may comprise a beam-deflection tube having a pair of output circuits which may be selectively coupled into the video channel as the electron beam thereof is deflected from one to the other of two segmental anodes according to the mode changes of the transmitted signal. As mentioned before, these mode changes take the form of variations in the timing of the video signal relative to the synchronizing signal of the received coded television signal by a time interval $\Delta t$. Consequently, the output circuit coupled to one anode segment includes a time delay network to introduce an incremental delay $\Delta t$ while the output connected to the other anode segment does not and the timing variations are compensated effectively to decode the television signal as the beam of the deflection tube is switched between its anodes. This switching effect is accomplished by means of a beam-deflection control or actuating signal applied to decoding device 16, as explained hereinafter.

Second detector 14 is also coupled to a synchronizing-signal separator 19 which is coupled, in turn, to a field-sweep system 20 and to a line-sweep system 21. The output terminals of sweep systems 20 and 21 are connected respectively to field- and line-deflection elements (not shown) associated with image reproducer 17.

Video amplifier 15 is also connected to the input terminals of a delay line 23, terminated in its characteristic impedance, which has three taps or terminals 24–26 along its length to provide three different time delays for the applied video signal; specifically, a delay equal to a line-trace interval minus a $\Delta t$ interval is defined by the first tap 24, a delay equal to a line trace is provided at the second tap 25, and a delay equal to a line trace plus a $\Delta t$ interval is presented at the last tap 26. Terminals 24–26 are connected respectively to the input terminals of three blanking circuits 27–29 which are connected respectively to three subtraction circuits 31–33. Video amplifier 15 is also connected to each of the subtraction circuits through a blanking circuit 34. A blanking pulse generator 35 has its input circuit connected to line-sweep system 21 to derive line-drive pulses therefrom and develops a blanking pulse for application to blanking circuits 27–29 and 34. The blanking circuits may be amplifiers which, in the presence of blanking pulses, establish the video signal at a level coinciding with the A.C. axis of the video signal. Circuits 27–29 and 34 therefore effectively blank out or remove the horizontal-synchronizing pulses and associated blanking pedestals of the signal applied to line 23. In this way, only the picture or video information itself is supplied to the subtraction circuits. The subtraction circuits may be conventional adders or mixers where one of the signals is applied with opposite phase.

The output terminals of subtraction circuits 31–33 are connected respectively to three full wave rectifiers 37–39 which in turn are connected respectively to three integrating circuits 41–43 each of which comprises the customary resistor and integrating condenser. The rectifiers and integrators are provided to develop three signals during each line-trace interval which individually have an amplitude determined by the video signals supplied to each subtraction circuit. In order to "wipe off" or discharge the charge that has accumulated on the condenser in each integrator during each line-trace interval, each one of integrating circuits 41–43 also includes a conventional discharge circuit such as a triode with the cathode and anode connected respectively to the two plates of the integrating condenser. A discharge pulse generator 44, actuated in response to line-drive pulses from line-sweep system 21, is connected to the grid of the discharge triode in each of the integrators to supply suitable discharge pulses to trigger the tube into conduction and thereby discharge the integrating condenser.

Three comparison circuits 45–47 are provided to compare the output signals from the integrators during each line-trace interval. Specifically, the output terminals of integrators 41 and 42 are connected to assigned input terminals of comparison circuit 45; the outputs of integrators 42 and 43 are connected to comparison circuit 46; and the output terminals of integrators 41 and 43 are connected to comparator 47. These comparison circuits, which are shown in detail in Figures 2–4 and will be described more particularly hereinafter, compare the various signals developed in the integrating circuits and derive a control effect in accordance with the relative amplitudes of the two signals supplied to each comparator. In order to perform this function, a read-out pulse generator 48, actuated in response to line-drive pulses from line-sweep system 21, supplies read-out pulses to each of the comparators 45–47 effectively to examine the relative intensities of the signals being compared during the occurrence of each such read-out pulse.

The output terminals of comparison circuit 45 are connected through a differentiating circuit 49 to one input of a coincidence circuit 50, and one output of comparison circuit 47 is connected through a differentiating circuit 51 to another input of coincidence circuit 50. The output circuit of comparator 46 is connected through a differentiating circuit 53 to one pair of input terminals of a coincidence circuit 54, and another pair of output terminals of comparison circuit 47 are connected through a differentiating circuit 55 to another input of coincidence circuit 54. The output terminals of coincidence circuits 50 and 54 are connected respectively to assigned input circuits of a bi-stable multivibrator 65 which, in turn, has its output terminals connected to the deflection elements of decoding device 16.

Figure 3:
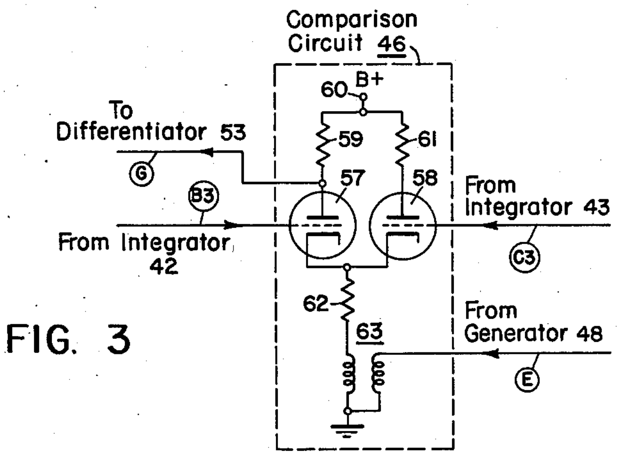
Figure 4:
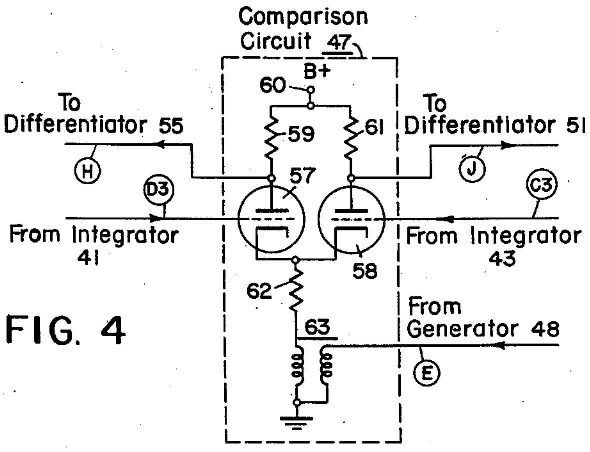

Consideration will now be given to the detailed circuitry of comparators 45–47 shown in Figures 2–4. They are identical in construction and corresponding parts thereof are designated by the same reference numerals. The only variation from circuit to circuit is in the signals applied and the signals developed. More specifically, each comparison circuit comprises two triodes 57, 58. The anode of tube 57 is connected through a load resistor 59 to a source of potential 60 and the anode of triode 58 is connected through a load resistor 61 to the same source. The cathodes of the triodes are connected together and through a resistor 62 and the secondary winding of a transformer 63 to ground. The primary of the transformer is connected to the output of generator 48. The control grid of tube 57 of comparator 45 is connected to the output of integrator 42 and the control grid of tube 58 of comparator 45 is connected to the output circuit of integrator 41. The anode of tube 57 of circuit 45 is connected to the input terminals of differentiator 49.

The control grid of tube 57 of comparison circuit 46 is connected to the output of integrator 42, and the control grid of tube 58 of circuit 46 is connected to the output of integrator 43. The anode of triode 57 of comparison circuit 46 is connected to the input circuit of differentiator 53. The grid of tube 57 of comparator 47 is connected to the output of integrator 41, and the grid of triode 58 of circuit 47 is connected to the output of integrator 43. The anode of tube 57 of circuit 47 is connected to the input of differentiator 55 and the anode of triode 58 is connected to differentiator 51.

The operation of the receiver will now be described, disregarding for the moment the effect of the decoding apparatus. The coded television signal is intercepted by antenna 11, amplified in radio-frequency amplifier 10, heterodyned to the selected intermediate frequency in first detector 12, amplified in intermediate-frequency amplifier 13 and detected in second detector 14 to produce the coded composite video signal. This signal is amplified in video amplifier 15 and translated through decoding device 16 to the input electrodes of image-reproducing device 17 to control the intensity of the electron beam of the device in well-known manner.

The synchronizing components are separated in separator 19, the field-synchronizing pulses being utilized to synchronize the operation of sweep system 20 and consequently the vertical deflection signal supplied to the field-deflection elements of reproducer 17, whereas the line-synchronizing pulses are utilized to synchronize sweep system 21 and therefore the horizontal deflection signal supplied to the horizontal deflection elements in the image reproducer. Of course, the sound modulated carrier wave normally received along with the video carrier is detected and reproduced in an appropriate audio system which has been omitted from the drawing for purposes of simplicity.

Figure 5:
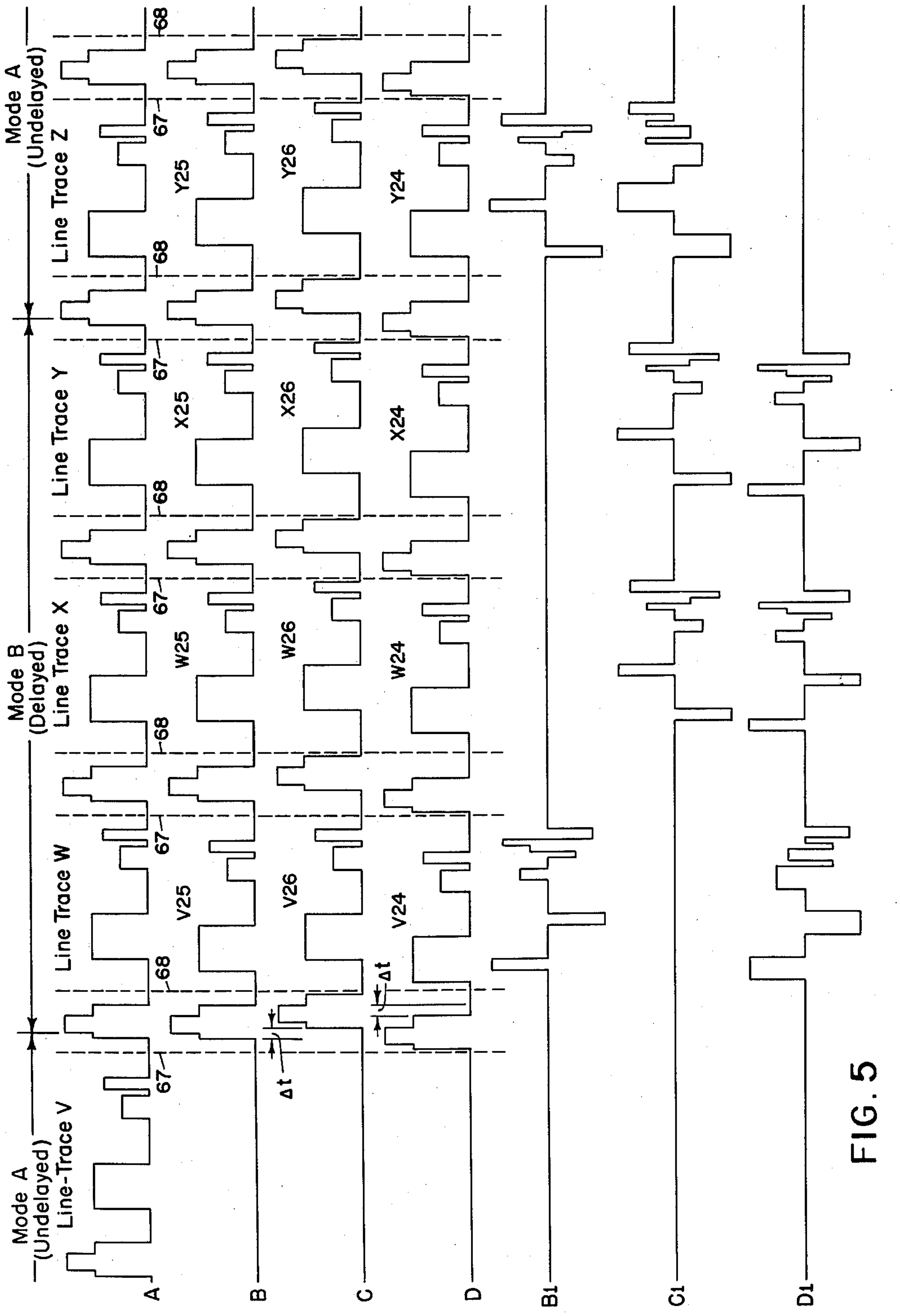
Figure 6:
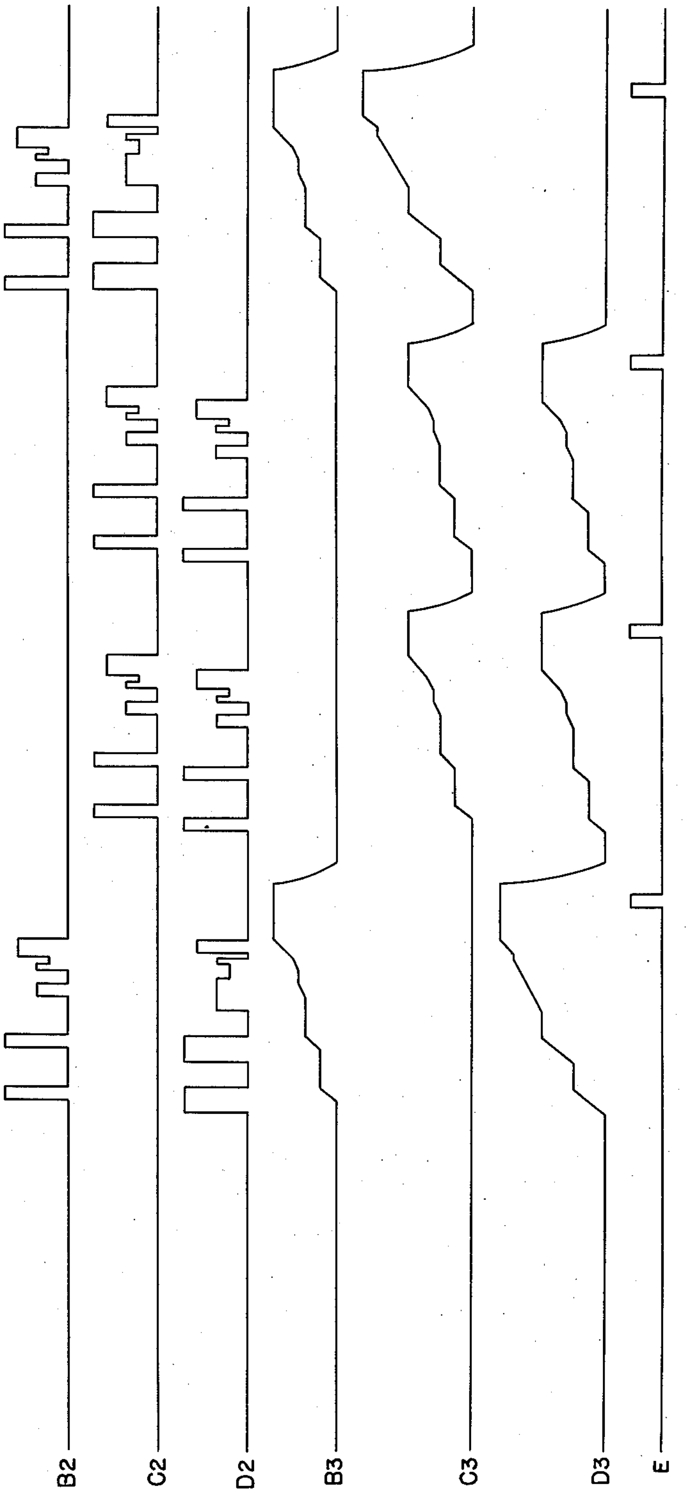
Figure 6, illustrate various waveforms helpful in explaining the operation of the decoding arrangement of Figure 1.
Figure 7:
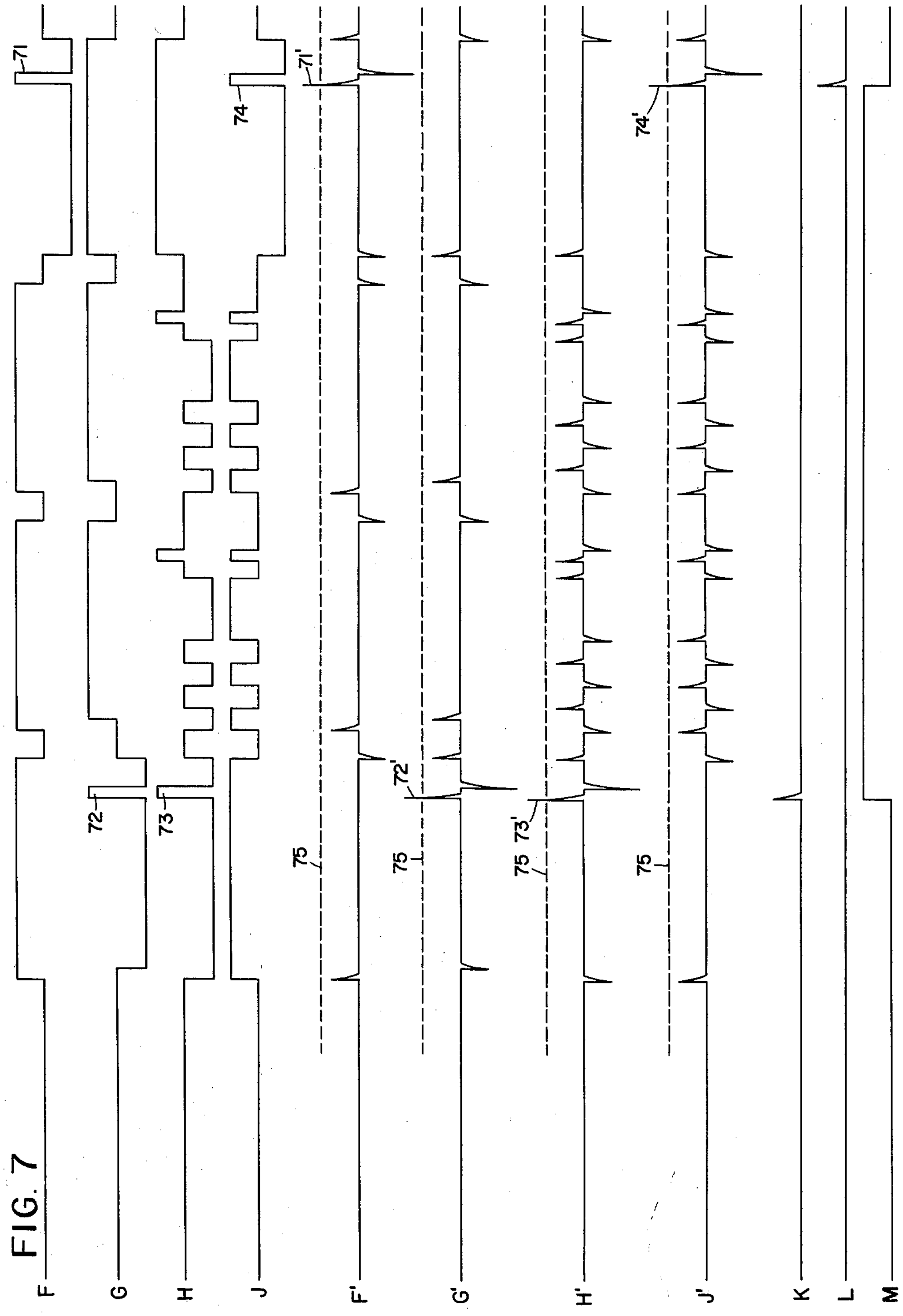

The detailed operation of the decoding circuitry will now be considered with particular reference to the idealized signal wave forms shown in Figures 5–7 which appear at various portions of the receiver indicated by encircled reference letters and numbers corresponding to the designations in the graphical representations. It will be remembered that in order to maintain the proper time relationship between the various curves, Figure 6 must be placed immediately below Figure 5, and Figure 7 must, in turn, be placed below Figure 6.

Curve A illustrates a coded television signal including video and synchronizing components where mode changes have been made by introducing a time delay $\Delta t$ between the video and synchronizing components during certain line-trace intervals. Five complete line traces have been shown designated V, W, X, Y and Z. It will be noted that the video or picture information in line traces W, X and Y is shifted slightly to the right (specifically, an increment $\Delta t$) to illustrate the timing of the video signals during the delayed mode operation. Thus, line traces V and Z which exhibit the conventional or undelayed mode of operation have been labeled "Mode A" and line traces W, X and Y being in the delayed mode have been designated collectively as a "Mode B" interval.

The coded television signal of curve A is developed in the output of video amplifier 15 and is supplied to the input of delay line 23. There it is delayed as it traverses the line and the signal of curve B is derived at tap or terminal 25, the signal of curve C at tap 26, and the signal of curve D at tap 24. The line traces V, W, X and Y of curve B have been delayed one entire line-trace interval relative to those of curve A. On the other hand, curve C illustrates line traces V–Y with delay of a complete line trace plus an increment $\Delta t$, and wave form D shows the coded television signal after it has been delayed for a line-trace interval minus the same increment $\Delta t$. In order to simplify the explanation of curves B, C and D, each line-trace interval has been designated with a letter V, W, X or Y indicating the line trace of curve A to which it corresponds. Subscripts 24–26 have been employed to indicate the particular taps from which the various signals are derived. For example, $V_{25}$ of curve B is the same as line trace V of curve A as it is derived at tap 25 of delay line 23. Since line trace W of the original signal occurs in mode B in which the picture information is delayed an increment $\Delta t$ with respect to its immediately preceding line-synchronizing component, line trace $V_{26}$ of the delayed signal of curve C appears exactly in time coincidence with line trace W of the undelayed signal. This follows from the fact that trace V of the original signal, which was transmitted in mode A, has been delayed one line plus an increment $\Delta t$ in arriving at line tap 26. It will be shown that this coincidence is utilized to provide an indication that, for trace W, a mode change has been made with respect to the previous line trace V and, moreover, that the mode assumed by line trace W is mode B.

In like fashion, the portion $W_{25}$ of the delayed signal of curve B occurs in time coincidence with the wave form of curve A during line trace interval X. Their coincidence results from the fact that both traces W and X of the received signal are in the same mode and the delay to line tap 25 equals one line trace. This coincidence, therefore, indicates that no mode change has been experienced in trace X with respect to trace W. Additionally, portion $X_{25}$ of the delayed signal of curve B occurs in exact coincidence with the waveform of curve A during line trace Y to indicate that no mode change has been made with respect to intervals X and Y. Line trace Z of the original signal is in mode A and is in time coincidence with the portion $Y_{24}$ of the delayed signal of curve D. The video of mode A is effectively advanced an increment $\Delta t$ relative to that of mode B and coincidence is realized here because signal portion $Y_{24}$ of curve D is a mode B segment of the original signal delayed a complete line trace less increment $\Delta t$. This coincidence indicates that there has been a change of mode as between intervals Y and Z and that the mode for interval Z is that designated A.

The original undelayed television signal of curve A is supplied from amplifier 15 to blanking circuit 34 and the delayed signals of curves B, C and D are supplied, respectively, to blanking circuits 28, 29 and 27 wherein all of the synchronizing and pedestal information between the dashed construction lines 67 and 68 is effectively removed or blanked out. The output of blanking circuit 28, which is the delayed signal of curve B minus the horizontal synchronizing and pedestal components, is supplied to subtraction circuit 32 wherein the undelayed video signal also stripped of horizontal synchronizing and pedestal components is subtracted therefrom. Thus, the wave form shown in curve B1 is developed at the output of subtraction circuit 32. Similarly, the picture information of the undelayed signal of wave form A is subtracted from the picture information of the delayed signal of wave form C in subtraction circuit 33 yielding the wave form of curve C1, and the picture information of the undelayed signal of wave form A is subtracted from the video information of the delayed signal of wave form D in subtraction circuit 31 to provide the wave form of curve D1. The signals of curves B1, C1, D1 are supplied respectively to full wave rectifiers 38, 39, 37 wherein they are rectified to develop the signals of curves B2, C2, D2, respectively.

Integrator 42 integrates the pulses of curve B2 which for the illustrated condition occur during line traces W and Z to develop the wave form of curve B3. The integrated wave form returns to a reference potential level during the horizontal retrace interval succeeding line trace W and succeeding line trace Z. This is the result of discharge pulses (not shown) supplied from generator 44 to integrator 42 in each line retrace to discharge the integrating condenser or "wipe off" the integration circuit. In like fashion, integrator 43 responds to the pulses of curve C2 during line traces X, Y and Z to develop the integrated wave form of curve C3, and integrator 41 responds to the pulses of curve D2 during line traces W, X and Y to develop the integrated wave form of curve D3. As in the case of integrator 42, discharge-pulse generator 44 supplies pulses to integrators 43 and 41 to discharge the integration circuits and restore a reference potential level after each line-trace interval.

Figure 2:
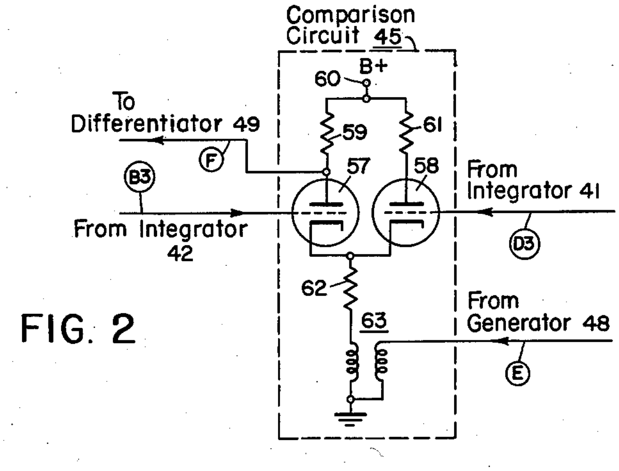
Figures 2, 3 and 4 illustrate in detail various components of the decoding arrangement of Figure 1; and, Figures 5, 6 and 7, with Figure 6 being placed immediately below Figure 5 and Figure 7 below

The signals of curves B3 and D3 are supplied to comparison circuit 45 shown in Figure 2. The comparator is essentially a trigger circuit which has three different operating conditions. When the potentials impressed on both grids are substantially the same, tubes 57 and 58 conduct and the potential at the anode of tube 57 is at some level less than B+ due to the voltage drop across resistor 59. If the voltage on the control grid of tube 58 exceeds that on the grid of triode 57, tube 58 conducts more current, causing an increased voltage drop across common cathode resistor 62; this, in turn, increases the cathode potential of tube 57, causing it to cease conducting. Thus, tube 58 conducts fully and tube 57 is cut off, resulting in a voltage rise at the anode of tube 57 to the value of source B+. By the same token, if the voltage on the grid of tube 57 becomes greater than that on the grid of tube 58, tube 57 becomes fully conductive and tube 58 cuts off and the potential at anode 57 decreases to a value less than that when both tubes are conducting.

The read-out pulses from generator 48, shown in curve E, are supplied to the primary winding of transformer 63 with such polarity as to cause both tubes to cut off. If tube 57 is fully conducting at the time its anode potential increases the maximum amount for the duration of the read-out pulse to provide a relatively high amplitude pulse at its anode. If tubes 57 and 58 are both conducting or if tube 57 is cut off when the read-out pulse arrives, the pulse, if any, developed at the anode of tube 57 is of much reduced amplitude during the read-out time. Thus, an anode pulse of maximum amplitude is developed only if the potential of the signal of wave form B3 is greater than that of the signal of curve D3 just prior to a read-out time.

The output signal derived at the anode of tube 57 of comparator 45, for the illustrative example, is shown in curve F. It will be noted that during line traces W, X and Y the amplitude of wave form D3 is greater than that of curve B3 and tube 57 is cut off, causing the voltage at its anode to rise to B+. During horizontal-retrace times, the signals applied to the control grids of both tubes 57 and 58 are essentially the same and the anode potential of tube 57 assumes a level less than B+. During the line trace Z, the amplitude of wave form B3 is higher than that of D3 and tube 57 becomes fully conductive. During the occurrence of the read-out pulse of curve E immediately subsequent to line trace Z, tube 57 shifts from its fully conductive to its nonconductive condition to produce a high amplitude pulse 71 at its anode.

In like manner, the signals of curve B3 and C3 are supplied to comparator 46 and produce the output signal shown in curve G. For the illustrative conditions, only during the line trace W is the amplitude of wave form B3 greater than that of waveform C3 to develop the high-amplitude pulse 72.

Comparison circuit 47 makes two comparisons. It produces a relatively large pulse at the anode of tube 57 when the potential of the signal of curve D3 is greater during a read-out time than the potential of the signal of curve C3, and it produces a relatively high amplitude pulse at the anode of tube 58 during a read-out time if the instantaneous amplitude of the signal of curve C3 is greater than that of the signal of curve D3. Curve H illustrates the wave form appearing at the output of tube 57 and curve J illustrates that appearing at the output of tube 58. For the case in question, during line trace W, the signal of curve D3 is greater than that of curve C3 and a pulse 73 is produced at the anode of tube 57. Additionally, during line trace Z the signal of curve C3 is greater than that of curve D3 and the high amplitude pulse 74 is produced at the anode of tube 58 during the read-out time immediately following line trace Z. With the exception of the read-out time intervals when both tubes are established at cut off, the wave forms of curves H and J are 180° out of phase. Wave forms H and J undergo a series of changes during line traces X and Y but this obtains since the wave forms of C3 and D3 during those line traces have the same wave shape but the signal of curve D3 occurs before that of C3; consequently, tube 57 conducts fully while the signal of curve D3 is instantaneously higher than that of C3 but as the level of C3 reaches the same instantaneous potential as D3, tube 58 begins to conduct and tube 57 falls back to its normal condition.

The signals of curves F, G, H and J are supplied respectively to differentiating circuits 49, 53, 55 and 51 wherein they are differentiated to produce the signals of curves F′, G′, H′ and J′. Because of the relatively high amplitude of pulses 71—74, corresponding high amplitude differentiated pulses 71′—74′ are developed. The signals of curves G′ and H′ are supplied to coincidence circuit 54 which responds only to the simultaneous application of pulses exceeding a predetermined threshold level shown by dashed construction lines 75 in curves G′ and H′. Thus, threshold coincidence circuit 54 responds to the simultaneous application of differentiated pulses 72′ and 73′ to produce the pulse shown in curve K. Similarly, coincidence circuit 50 is biased to respond only to the simultaneous application of pulses in curves F′ and J′ exceeding a potential level indicated by dashed construction lines 75. Thus, coincidence circuit 50 responds to differentiated pulses 71′ and 74′ to produce the pulse shown in curve L. The signals of curves K and L are supplied to bi-stable multivibrator 65 to trigger it back and forth between its two operating conditions, the pulse of curve K triggering it to one of its operating conditions and the pulse of curve L flipping it to its other operating condition. The output signal of the multivibrator is shown in curve M and is applied to the deflection control elements of the beam-deflection tube in decoder 16 to shift the operating condition of the decoder and insert or remove a delay line from the video channel each time there is an amplitude change in the signal of curve M. This manipulation of the decoder compensates for the mode changes in the received signal and effects decoding.

By way of summary, comparison circuit 45 responds to the signal of curve B3 derived from delay line 23 with a delay corresponding to an integral number of line trace intervals and conjointly responds to the signal of curve D3 also obtained from line 23 but with a delay which is less than the complete number of line trace intervals by the time increment $\Delta t$. The output signal resulting from the operation of comparison circuit 45 as shown in curve F includes a unique condition (a high amplitude pulse 71) for a unique change in mode of the received signal. Specifically, this unique signal condition results whenever there has been a change from a delayed to an undelayed transmitting mode. At the same time, the signal of curve B3 is compared in unit 46 with the signal of curve C3 likewise obtained from delay line 23 with a delay which exceeds an integral number of line trace intervals by an amount corresponding to the time increment $\Delta t$. Examination of the output signal of curve G shows a unique signal condition (again a pulse of high amplitude 72) for a unique change in mode of transmission. Specifically, for this case the unique signal condition results whenever the mode changes from undelayed to delayed. So long as the mode remains the same from one line trace interval to the next, neither the signal of curve F nor that of curve G exhibits a high amplitude pulse. Accordingly, on the basis of the discussion thus far, which is predicated upon an idealized condition in which the video information of one line is completely correlated with that of the next, complete information denoting a change in mode and the sense of that change is obtainable from examination of the output signals of comparison circuits 45 and 46.

In practice, of course, there is no such perfection of correlation and allowance must be made for changes of video content from line to line. Such allowance is accommodated and the reliability of mode changing information assured by coincidence circuits 50 and 54 which, operating in the manner explained above, produce the output pulses of curves K and L to designate the fact of a change in mode and the sense in which the change takes place. It should be understood that while in the disclosed embodiment the comparisons have been facilitated by integrating the remainder of each subtraction process wherein one signal is subtracted from another, such comparisons could similarly be made by initially integrating the product of the two signals, the sum, the square of the sum, the sum for the squares, or the cross-correlation products of the two signals as formed with some specified function.

Usually, a television signal which has been coded by varying the time relationship between video and synchronizing components remains in one of its modes for a number of line traces more than the three shown in the wave forms of Figures 5–7 associated with mode B. In the aforementioned Roschke application Serial No. 366,727, for example, the system shifts modes after every fifteen line trace intervals. However, it should be appreciated that the present system has been illustrated as being placed in mode B for only three line traces for convenience of explanation in order to illustrate the manner in which the mode changes are determined.

Moreover, it is appreciated that in the illustrated embodiment one entire line trace is effectively lost each time the received signal experiences a mode change, since each mode variation is not determined until after the received television signal has been in a new mode for one line trace. However, when the mode changes do not occur until after each series of several line traces, as is the case in the aforementioned Roschke application Serial No. 366,727, the loss of one line for each mode change does not lessen the image intelligibility to any considerable degree. If, however, it is desired to decode every single line trace in each field, suitable video storage apparatus may be employed to delay the received video signal for a line-trace interval before it is applied to the picture tube. Meanwhile, mode change determinations may be made as described. In this way, the delayed video signal may then be switched between modes at the precise intervals of mode change.

The invention provides, therefore, a decoding arrangement for decoding a received coded television signal the transmitting mode of which has been varied from one to another of a plurality of modes in accordance with a predetermined code schedule. The decoding arrangement determines the mode changing pattern or code schedule by examining the received coded signal and comparing successive portions thereof.

While a particular embodiment of the invention has been shown and described, modifications may be made, and it is intended in the appended claims to cover all such modifications as may fall within the true spirit and scope of the invention.

I claim:

1. A decoding arrangement for utilizing a received coded television signal which contains signal components of various frequencies falling within a predetermined range and which has been varied in mode from one to another of a plurality of modes in accordance with a predetermined code schedule, comprising: means for selecting and comparing with respect to one another successive portions of equal duration of said coded television signal, said portions being long compared to the periods of said signal components and representing different intelligence information, to determine from the comparisons each mode change and to develop an actuating signal specifying the mode changes; and a decoding device operated in response to said actuating signal for varying the mode of said coded television signal effectively to decode said television signal.

2. A decoding arrangement for utilizing a received coded television signal including video components and synchronizing components of frequencies falling within a predetermined range and which has been varied in mode from one to another of a plurality of modes in accordance with a predetermined code schedule, comprising: means for selecting and comparing with respect to one another successive portions of equal duration of said video components, said portions being long compared to the periods of said video components and representing different video information, to determine from the comparisons each mode change and to develop an actuating signal specifying the mode changes; and a decoding device operated in response to said actuating signal for varying the mode of said coded television signal effectively to decode said television signal.

3. A decoding arrangement for utilizing a received coded television signal which contains signal components of various frequencies falling within a predetermined range and which has been varied in mode from one to another of a plurality of modes in accordance with a predetermined code schedule, comprising: means for selecting a first portion of said coded television signal long in duration compared to the periods of said signal components; means for selecting a subsequent second portion of said coded television signal equal in duration to the first portion and representing different intelligence information than that represented by the first portion; means for comparing said first and second portions to determine the mode of said second portion and to develop an actuating signal indicating such mode; and a decoding device controlled by said actuating signal effectively to decode said television signal.

4. A decoding arrangement for utilizing a received coded television signal including video components in recurring trace intervals and synchronizing components in intervening retrace intervals representing an uncoded television signal which has been coded by varying said uncoded signal from one to another of a plurality of modes in accordance with a predetermined code schedule, comprising: means for selecting a first trace interval; means for selecting a subsequent, second trace interval; means for comparing said first and second trace intervals to develop an actuating signal indicating a particular change in mode of said second interval relative to said first interval; and a decoding device controlled by said actuating signal effectively to decode said television signal.

5. A decoding arrangement for utilizing a received coded television signal including video components in recurring line-trace intervals and synchronizing components in intervening line-retrace intervals representing an uncoded television signal which has been coded by varying said uncoded signal from one to another of a plurality of modes in accordance with a predetermined code schedule, comprising: means for selecting a first line-trace interval; means for selecting a subsequent, second line-trace interval; means for comparing said first and second line-trace intervals to develop an actuating signal indicating a particular change in mode of said second interval relative to said first interval; and a decoding device controlled by said actuating signal effectively to decode said television signal.

6. A decoding arrangement for utilizing a received coded television signal including video components in recurring line-trace intervals and synchronizing components in intervening line-retrace intervals representing an uncoded television signal which has been coded by varying said uncoded signal from one to another of a plurality of modes in accordance with a predetermined code schedule, comprising: means for delaying each of said line-trace intervals means for comparing each delayed line-trace interval with the immediately succeeding line-trace interval to develop an actuating signal indicating each change in mode; and a decoding device operated in response to said actuating signal for varying the mode of said coded television signal effectively to decode said television signal.

7. A decoding arrangement for utilizing a received coded television signal including video components in recurring line-trace intervals and synchronizing components in intervening line-retrace intervals representing an uncoded television signal which has been coded by varying the time relationship between the video and synchronizing components from time to time in accordance with a predetermined code schedule, comprising: means for delaying each of said line-trace intervals; means coupled to said delaying means for comparing each of said line-trace intervals with the immediately succeeding line-trace interval to determine the instantaneous time relationship between the video and synchronizing components and to develop an actuating signal indicating each time relationship change; and a decoding device controlled by said actuating signal effectively to decode said television signal.

8. A decoding arrangement for utilizing a received coded television signal including video components in recurring line-trace intervals and synchronizing components in intervening line-retrace intervals representing an uncoded television signal which has been varied in accordance with a predetermined code schedule from a conventional mode to a delayed mode where a time interval $\Delta t$ has been introduced between the synchronizing and video components, comprising: means for delaying said received signal to develop a first signal delayed an integral number of line-trace intervals, a second signal delayed an integral number of line trace intervals plus a time increment $\Delta t$, and a third signal delayed an integral number of line trace intervals minus time increment $\Delta t$; means for subtracting said received signal simultaneously from each of said delayed signals to derive three output signals collectively indicating the occurrence of a mode change and the sense of such change of any line trace interval relative to the immediately preceding line trace interval; a decoding device; and means for utilizing said output signals to control said decoding device effectively to decode said television signal.

9. A method of operating a secrecy television receiver to utilize a received coded television signal containing signal components of various frequencies falling within a predetermined range and representing an uncoded television signal which has been coded by varying said uncoded signal from one to another of a plurality of modes in accordance with a predetermined code schedule, comprising the steps of: selecting and comparing with respect to one another successive portions of equal duration of said coded television signal, said portions being long compared to the periods of said signal components and representing different intelligence information, to determine from the comparisons each mode change; developing an actuating signal representing the mode changes; and varying the mode of said coded television signal in response to and under the control of said actuating signal effectively to decode said television signal.

10. A decoding arrangement for utilizing a received coded television signal including video components in recurring line-trace intervals and synchronizing components in intervening line-retrace intervals representing an uncoded television signal which has been varied in accordance with a predetermined code schedule from a conventional mode to a delayed mode where a time interval $\Delta t$ has been introduced between the synchronizing and video components, comprising: means for delaying said received signal to develop a first signal delayed an integral number of line-trace intervals, a second signal delayed an integral number of line-trace intervals plus a time increment $\Delta t$, and a third signal delayed an integral number of line-trace intervals minus time increment $\Delta t$; means for utilizing said first and second signals to provide a unique signal condition indicative of a change in mode of the received television signal in one sense; means for utilizing said first and third signals for providing a unique signal condition indicating a change in mode of the received television signal in opposite sense; a decoding device; and means for utilizing said signal conditions to operate said decoding device effectively to decode said television signal.

11. A decoding arrangement for utilizing a received coded television signal which contains signal components of various frequencies falling within a predetermined range and which has been varied in mode from one to another of a plurality of modes in accordance with a predetermined code schedule, comprising: means for selecting and comparing with respect to one another successive portions of equal duration of said coded television signal, said portions being long compared to the periods of said signal components and representing different intelligence information, to provide from the comparisons a first unique signal condition indicating a change from a predetermined first mode to a predetermined second mode and a second unique second condition indicative of a change from said predetermined second mode to said predetermined first mode; a decoding device; and means for utilizing said first and second signal conditions to effect operation of said decoding device effectively to decode said television signal.

12. A decoding arrangement for utilizing a received coded television signal which contains signal components of various frequencies falling within a predetermined range and which has been varied in mode from one to another of a plurality of modes in accordance with a predetermined code schedule, comprising: means for selecting and comparing with respect to one another successive portions of equal duration of said coded television signal, said portions being long compared to the periods of said signal components and representing different intelligence information, to provide from the comparisons a first control signal in response to a change from a predetermined first mode to a predetermined second mode and a second control signal in response to a change from said predetermined second mode to said predetermined first mode; a decoding device; and means for utilizing said first and second control signals to effect operation of said decoding device effectively to decode said television signal.

13. A decoding arrangement for utilizing a received coded television signal including video components in recurring line-trace intervals and synchronizing components intervening line-trace intervals representing an uncoded television signal which has been varied in accordance with a predetermined code schedule from a conventional mode to a delayed mode where a time interval $\Delta t$ has been introduced between the synchronizing and video components, comprising: means for delaying said received signal to develop a first signal delayed an integral number of line-trace intervals, a second signal delayed an integral number of line-trace intervals plus a time increment $\Delta t$, and a third signal delayed an integral number of line-trace intervals minus time increment $\Delta t$; means for subtracting said received signal simultaneously from each of said first, second and third delayed signals to derive, respectively, first, second and third output signals; first comparing means for comparing said first and third output signals to provide a control signal each time there is a change in mode of the received signal from the delayed to the conventional mode; second comparing means for comparing said first and second output signals to provide a control signal each time there is a change in mode of the received signal from the conventional to the delayed mode; third comparing means for comparing said second and third output signals to provide a control signal each time there is a change in mode of the received signal from the conventional to the delayed mode; fourth comparing means for comparing said second and third output signals to provide a control signal each time there is a change in mode of the received signal from the delayed to the conventional mode; a decoding device having two operating conditions; and coincidence means responsive to the time coincidence of control signals from said first and fourth comparing means for effecting operation of said decoding device to one of its operating conditions and responsive to the coincidence of control signals from said second and third comparing means for effecting actuation of said decoding device to its other operating condition effectively to decode said television signal.

References Cited in the file of this patent

UNITED STATES PATENTS

| | | |
|---|---|---|
| 2,472,774 | Mayle | June 7, 1949 |
| 2,701,305 | Hopper | Feb. 1, 1955 |
| 2,732,424 | Oliver | Jan. 24, 1956 |
| 2,757,226 | Zworykin | July 1, 1956 |